(12) United States Patent
Ford (10) Patent No.: US 11,271,410 B2
(45) Date of Patent: Mar. 8, 2022

(54) BATTERY HARVESTING DEVICE AND METHOD

(71) Applicant: 9609385 CANADA INC., Beaconsfield (CA)

(72) Inventor: Timothy D. F. Ford, Beaconsfield (CA)

(73) Assignee: 9609385 CANADA INC.

( * ) Notice: Subject to any disclaimer, the term of this patent is extended or adjusted under 35 U.S.C. 154(b) by 888 days.

(21) Appl. No.: 15/960,730

(22) Filed: Apr. 24, 2018

(65) Prior Publication Data
US 2018/0309305 A1 Oct. 25, 2018

Related U.S. Application Data

(60) Provisional application No. 62/488,909, filed on Apr. 24, 2017.

(51) Int. Cl.
| | |
|---|---|
| *H02J 7/00* | (2006.01) |
| *H02J 7/14* | (2006.01) |
| *H01M 10/42* | (2006.01) |
| *H01M 10/44* | (2006.01) |
| *H01M 10/48* | (2006.01) |
| *H01M 50/213* | (2021.01) |

(52) U.S. Cl.
CPC ......... *H02J 7/0024* (2013.01); *H01M 10/425* (2013.01); *H01M 10/441* (2013.01); *H01M 10/482* (2013.01); *H01M 50/213* (2021.01); *H02J 7/007* (2013.01); *H02J 7/0021* (2013.01); *H02J 7/0042* (2013.01); *H01M 2220/30* (2013.01); *H02J 7/00* (2013.01); *H02J 2207/20* (2020.01)

(58) Field of Classification Search
USPC ........................................................ 320/132
See application file for complete search history.

(56) References Cited

U.S. PATENT DOCUMENTS

| | | | | | |
|---|---|---|---|---|---|
| 5,057,761 | A | * | 10/1991 | Felegyhazi, Sr. ... | H02J 7/00047 320/110 |
| 5,686,811 | A | * | 11/1997 | Bushong ............... | H02J 7/0042 320/110 |
| 6,610,941 | B2 | * | 8/2003 | Pfeiffer ............... | H02J 7/00043 200/61.58 R |
| 7,764,045 | B2 | * | 7/2010 | Hoffman ............... | H02J 7/0034 320/107 |

(Continued)

*Primary Examiner* — Alexis B Pacheco
(74) *Attorney, Agent, or Firm* — Lavery, De Billy, LLP; Hugh Mansfield (57) ABSTRACT

A battery harvesting device and methods are disclosed for powering a load with a plurality of standardised batteries of different battery chemistries, each of the standardised batteries having a battery output voltage lower than a nominal voltage. The harvester comprises a power bus for attachment to the load, at least one receptacle arranged into each of a plurality of clusters, each receptacle configured for receiving one of the standardised batteries, each cluster further comprising electronics comprising an input connected to the receptacle and an output connected to the power bus, and a DC-DC boost circuitry for raising a battery output voltage of a connected one of the standardised batteries, and a processor for controlling the electronics such that each of the outputs connected the power bus is maintained at the nominal voltage.

3 Claims, 10 Drawing Sheets

(56) References Cited

U.S. PATENT DOCUMENTS

| | | | | |
|---|---|---|---|---|
| 2007/0247105 A1* | 10/2007 | Krieger | ................ | H02J 7/0045 320/104 |
| 2012/0007555 A1* | 1/2012 | Bukow | ................ | H02J 7/0044 320/110 |
| 2012/0262121 A1* | 10/2012 | Kuo | ................ | H02J 7/0019 320/126 |
| 2013/0285612 A1* | 10/2013 | Okuda | ................ | H02J 7/0068 320/126 |
| 2014/0009117 A1* | 1/2014 | Ishii | ................ | H01M 10/482 320/126 |
| 2014/0021925 A1* | 1/2014 | Asakura | ................ | H02J 7/0031 320/126 |
| 2015/0077061 A1* | 3/2015 | Nomura | ................ | H02J 7/0003 320/126 |
| 2015/0338466 A1* | 11/2015 | Wu | ................ | H02J 7/0021 320/126 |

* cited by examiner

BATTERY HARVESTING DEVICE AND METHOD

FIELD OF THE INVENTION

The present invention relates to a battery harvesting device and system. In particular, the present invention relates to a device which powers a bus at a nominal voltage using batteries of a variety of different standardized types.

BACKGROUND

The prior art discloses circuits for recovering energy from partially spent batteries, generally referred to as scavenger circuits. One drawback of such prior art devices is that they are limited to recovering energy from a single source voltage or battery type, thereby greatly limiting their use in the field. Another drawback is that the recovered energy can only be used to recharge batteries of a single battery, again thereby greatly limiting their use in the field.

SUMMARY OF THE INVENTION

In order to address the above and other drawbacks there is provided a battery harvester for powering a load with a plurality of standardised batteries of different battery chemistries, each of the standardised batteries having a battery output voltage lower than a nominal voltage. The harvester comprises a power bus for attachment to the load, at least one receptacle arranged into each of a plurality of clusters, each receptacle configured for receiving one of the standardised batteries, each cluster further comprising electronics comprising an input connected to the receptacle and an output connected to the power bus, and a DC-DC boost circuitry for raising a battery output voltage of a connected one of the standardised batteries, and a processor for controlling the electronics such that each of the outputs connected the power bus is maintained at the nominal voltage.

There is also provided a method of providing portable power at a nominal voltage. The method comprises connecting an output of each of a powering set of at least one standardised battery in parallel, sensing an output voltage of each of the powering set, sensing an open circuit voltage of each of a non-powering set of at least one standardised battery, comparing the sensed output voltage with each of the open circuit voltage, connecting an output of each of the non-powering set of batteries having an open circuit voltage within a predetermined voltage of the output voltage in parallel with an output of each of the powering set of batteries, modulating the output with a PWM signal, the PWM signal having a duty cycle, inputting the modulated output into a flyback DC-DC boost, monitoring an output of the flyback DC-DC boost, and adjusting the duty cycle of the PWM signal such that the flyback DC-DC boost output is maintained at the nominal voltage.

Additionally, there is provided a method of powering a load from a plurality of standardised batteries. The method comprises interconnecting each of the plurality of standardised batteries in parallel and with the load with a respective electronic boost circuit, for each battery of a plurality of standardised batteries: raising an output voltage towards a nominal voltage at an output current using the respective electronic boost circuit, sensing an output voltage of the electronic boost circuit, and reducing the output current of the electronic boost circuit responsive to the sensed output voltage and such that the raised output voltage reaches the nominal voltage.

DETAILED DESCRIPTION OF THE ILLUSTRATIVE EMBODIMENTS

Figure 1A:
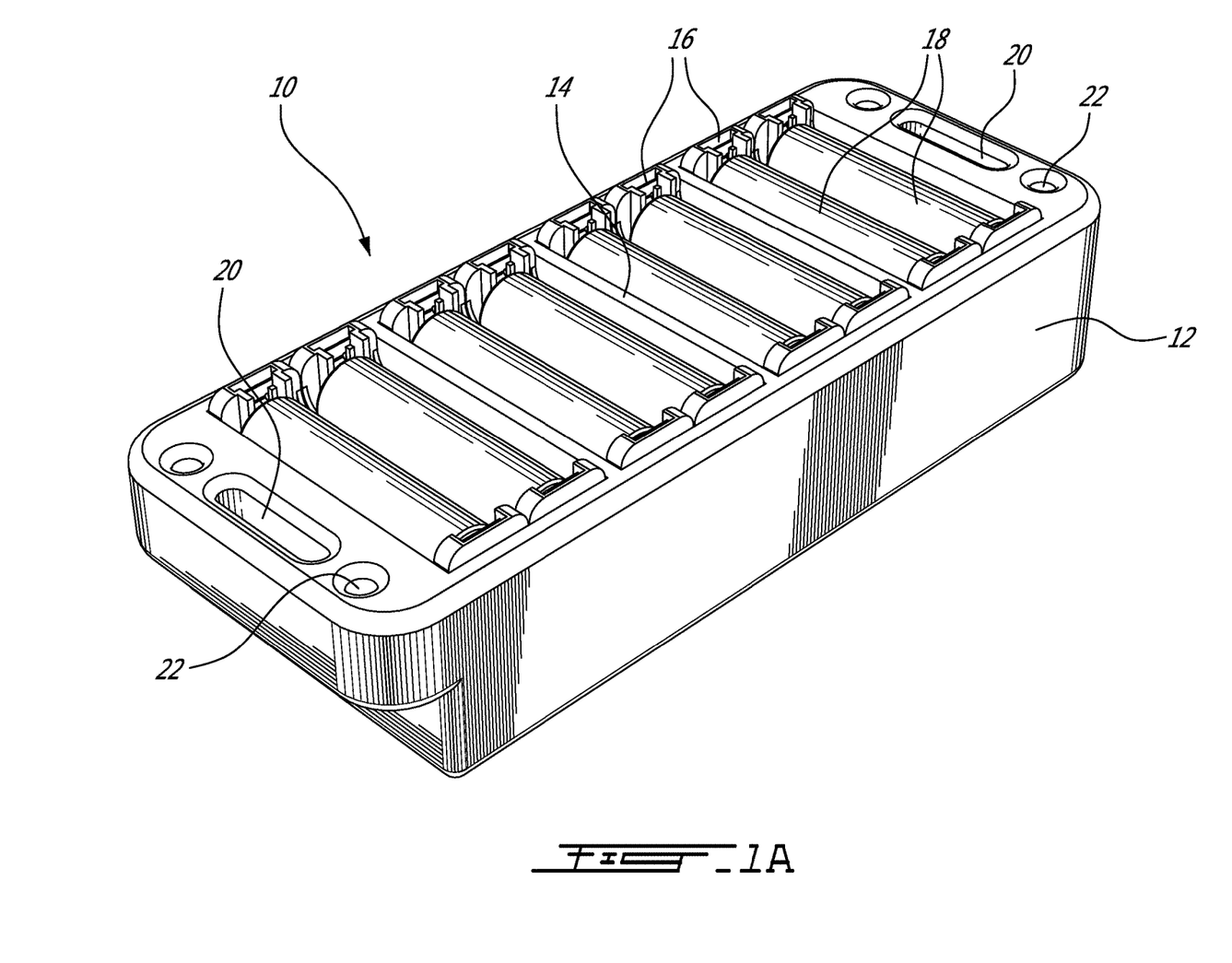
FIG. 1A provides an isometric view of a battery harvester in accordance with an illustrative embodiment of the present invention.
Figure 1B:
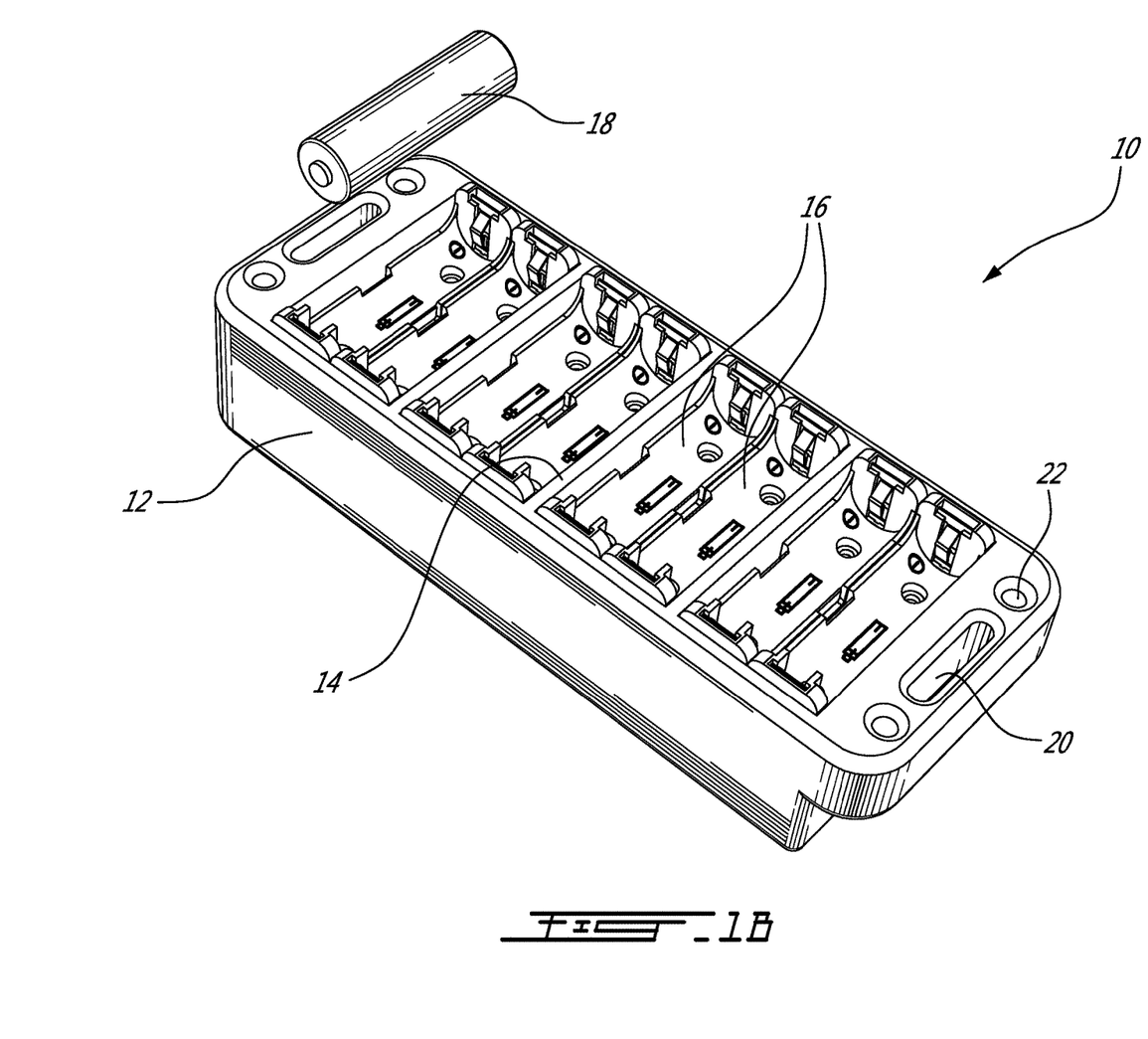
FIG. 1B provides a reversed isometric view of a battery harvester in accordance with an illustrative embodiment of the present invention.

Referring now to FIGS. 1A and 1B, a battery harvester, generally referred to using the reference numeral 10, and in accordance with an illustrative embodiment of the present invention will now be described. The battery harvester 10 comprises a housing 12 defining a first bay 14 comprised of a plurality of receptacles 16 arranged in pairs. Each receptacle 16 is configured for illustratively receiving a single AA type battery 18. The housing also comprises slots, or belt loops, for receiving a belt or the like. Eyelets 20 may also be provided for receiving cord or the like.

Still referring to FIGS. 1A and 1B, the battery harvester 10 is advantageously in one embodiment dimensioned to arrive at an overall size which fits snugly into a standard sized ammo pouch (not shown) and such that the harvester 10 can be easily transported by soldier (not shown) using his regular equipment.

Figure 2:
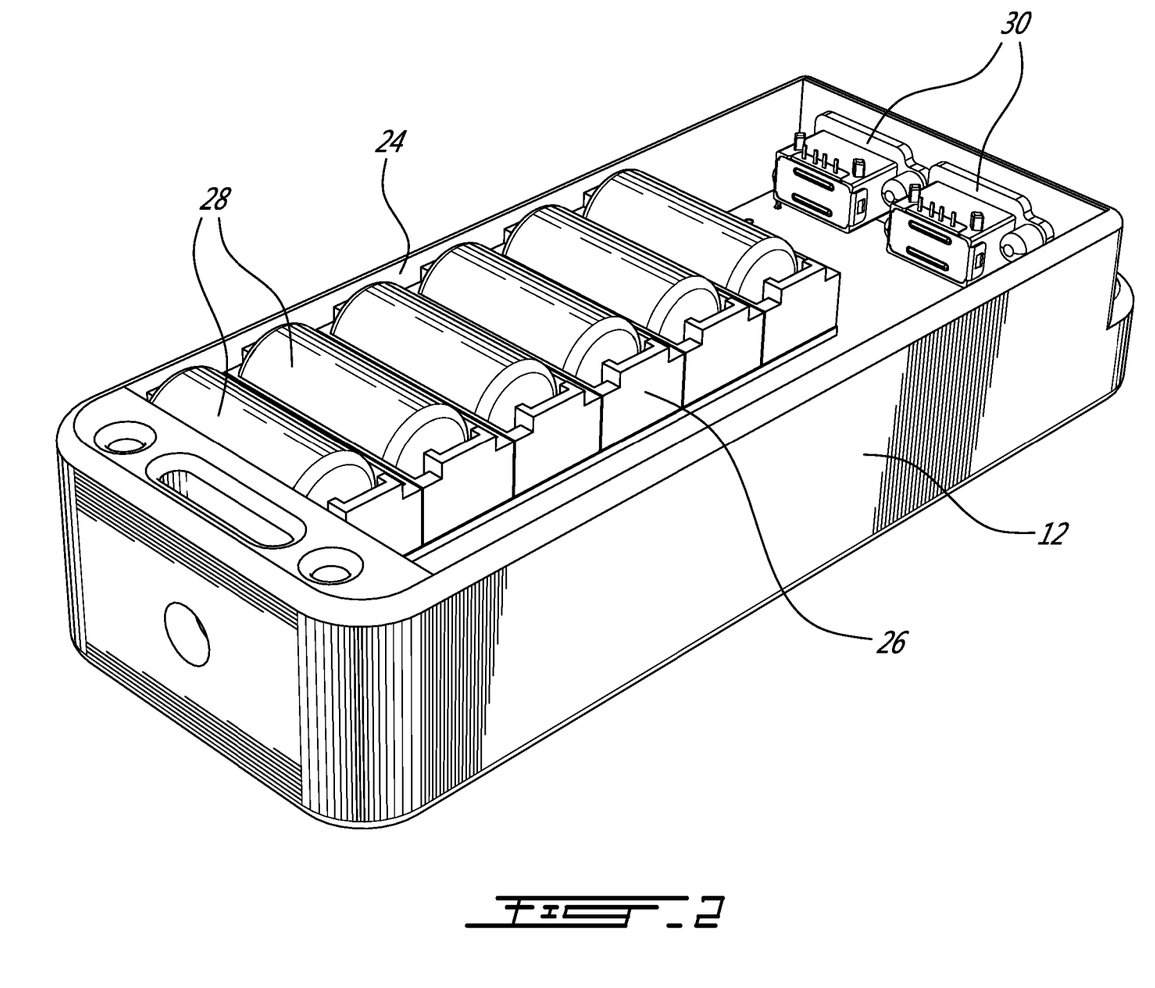
FIG. 2 provides a perspective view of an underneath of a battery harvester in accordance with an illustrative embodiment of the present invention.

Referring to FIG. 2, in a particular embodiment the body 12 may comprise a second bay 24 on a second side thereof and comprising a plurality of receptacles 26 each configured to receive a CR123 type battery 28.

Figure 3:
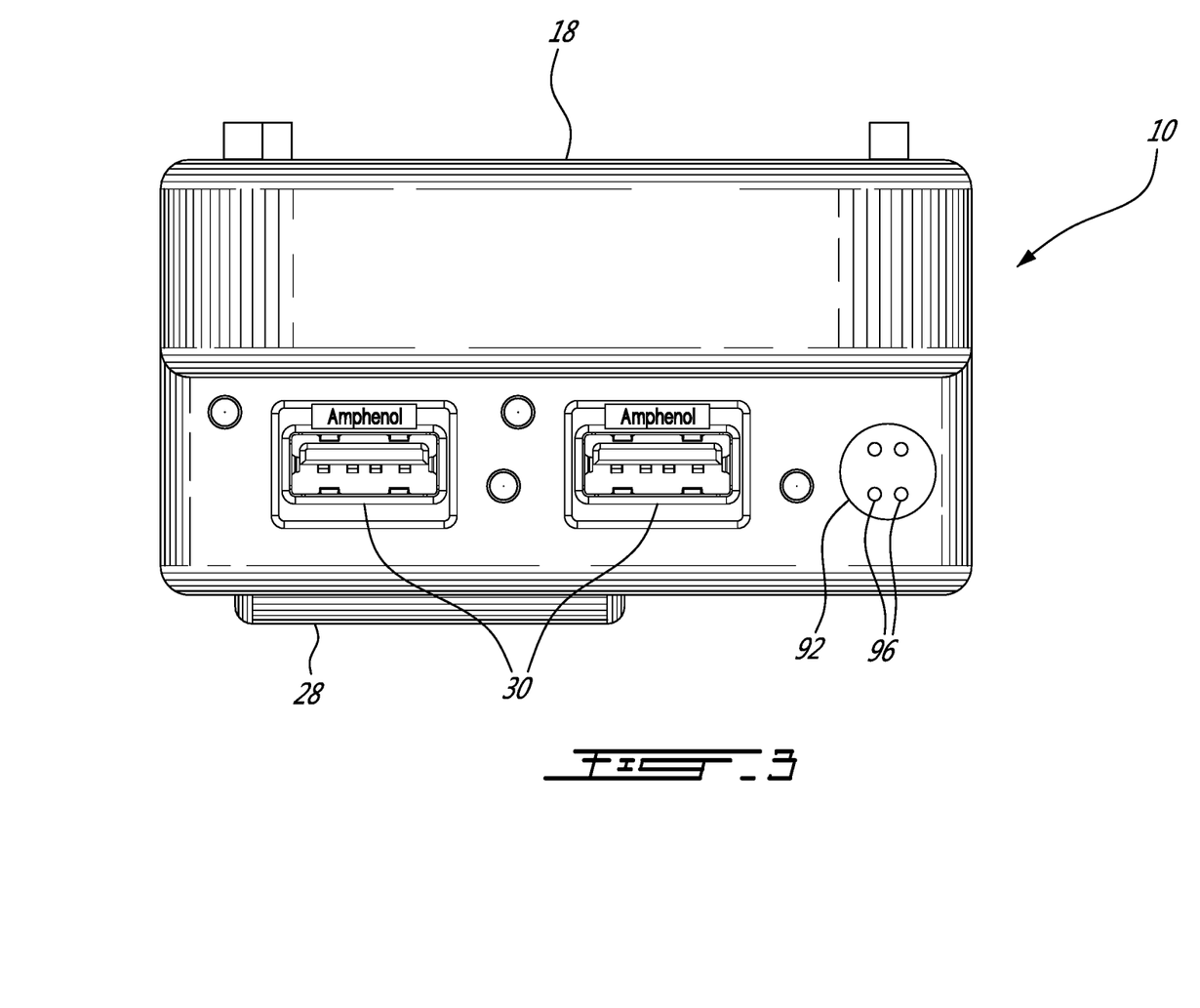
FIG. 3 provides an end plan view of a battery harvester in accordance with an illustrative embodiment of the present invention.

Referring to FIG. 3 in addition to FIG. 2, as will be discussed in more detail below, a pair of USB type receptacles 30 are provided and which may be used to power external devices from power harvested from the batteries 18 and/or 28.

Figure 4A:
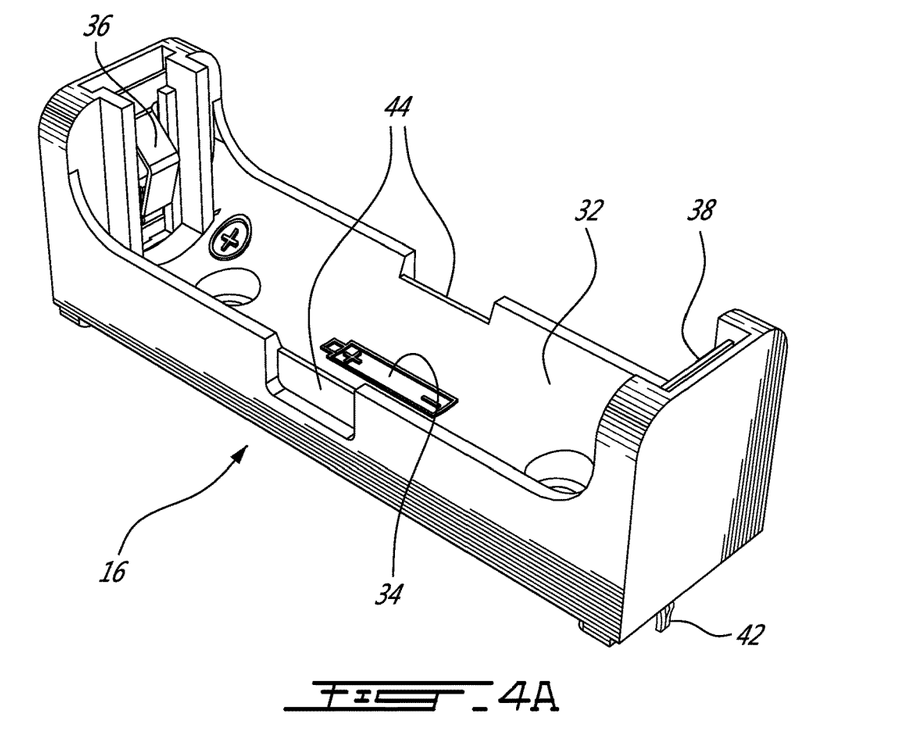
FIGS. 4A and 4B provide alternate views of a receptacle in accordance with an illustrative embodiment of the present invention.
Figure 4B:
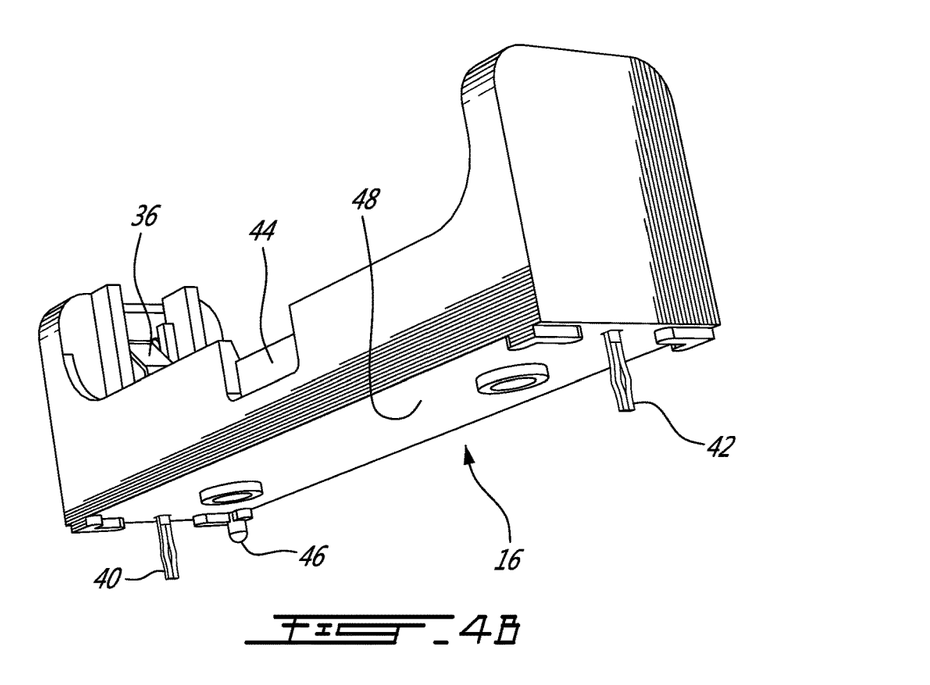

Referring to FIGS. 4A and 4B, each receptacle 16 comprises a battery receiving bed 32 shaped to generally receive a respective one of the batteries 18 or 28 therein. An icon 34 indicating the appropriate orientation of the battery (not shown) can be molded into the bottom of the bed 32.

Contacts 36, 38 are positioned at either end of the receptacle 16 which, as will be discussed in more detail below, are electrically connected to a printed circuit board (PCB) via a respective contact pin 40, 42. Cutouts 44 are provided in the receptacles to simplify the extraction of a battery placed therein. An orientation pin 46 is provided on the bottom side 48 of the receptacle 16 to ensure that the receptacle 16 is installed in the correct orientation during assembly.

Figure 5A:
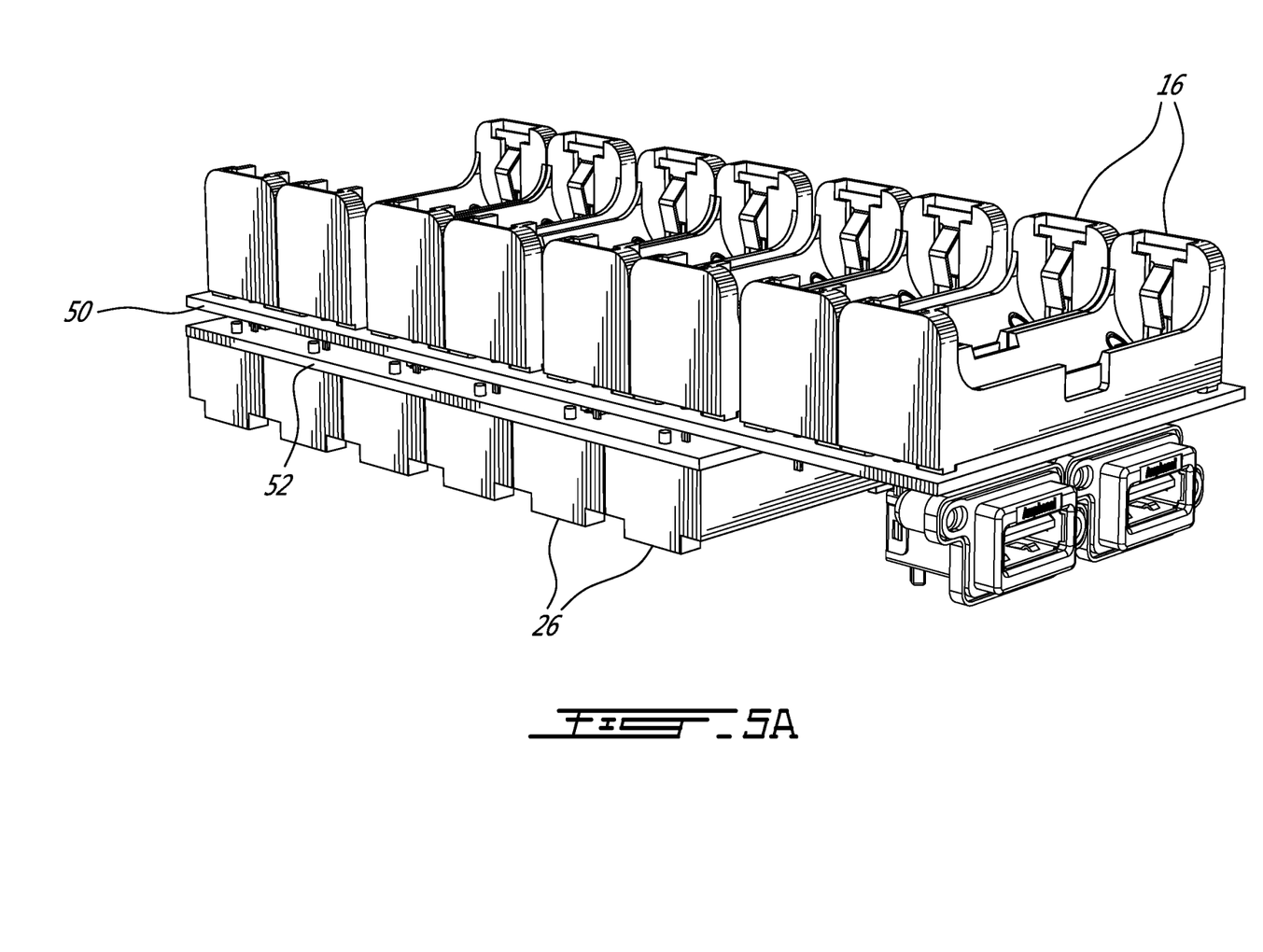
FIG. 5A provides a perspective view of a battery harvester with the housing removed and in accordance with an illustrative embodiment of the present invention.
Figure 5B:
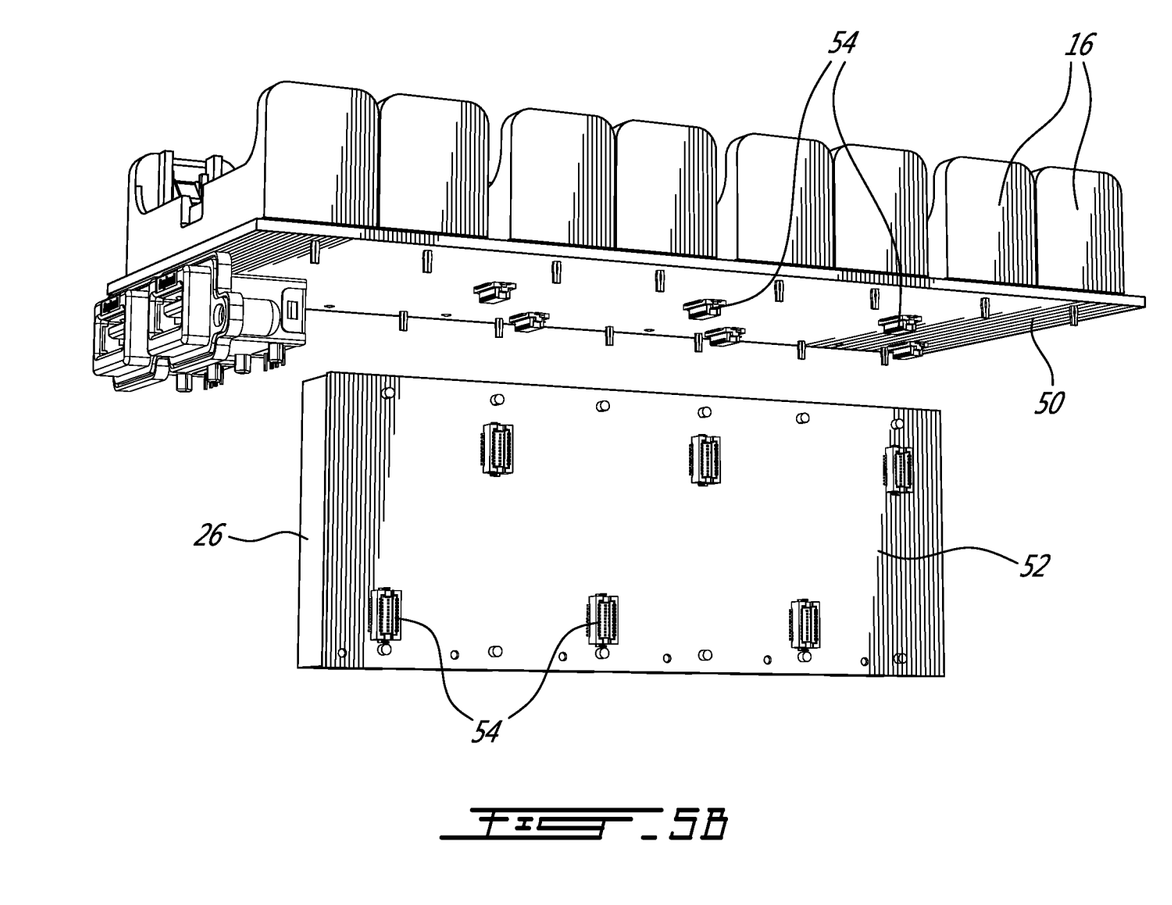
FIG. 5B provides a lowered perspective view of the battery harvested with the housing removed and in accordance with an illustrative embodiment of the present invention.

Referring now to FIGS. 5A and 5B, as discussed above, the AA receptacles 16 are mounted on a first PCB 50. Similarly, the CR123 receptacles 26 are mounted on a second PCB 52. The first PCB 50 and second PCB 52 are interconnected during assembly via a plurality of mezzanine type connectors 54 thereby allowing data and power and the like to be transferred between boards. Each PCB 50, 52 comprises the electronics necessary for harvesting power from batteries positioned in their respective receptacles and according to a control strategy as will be described in more detail below.

Figure 6:
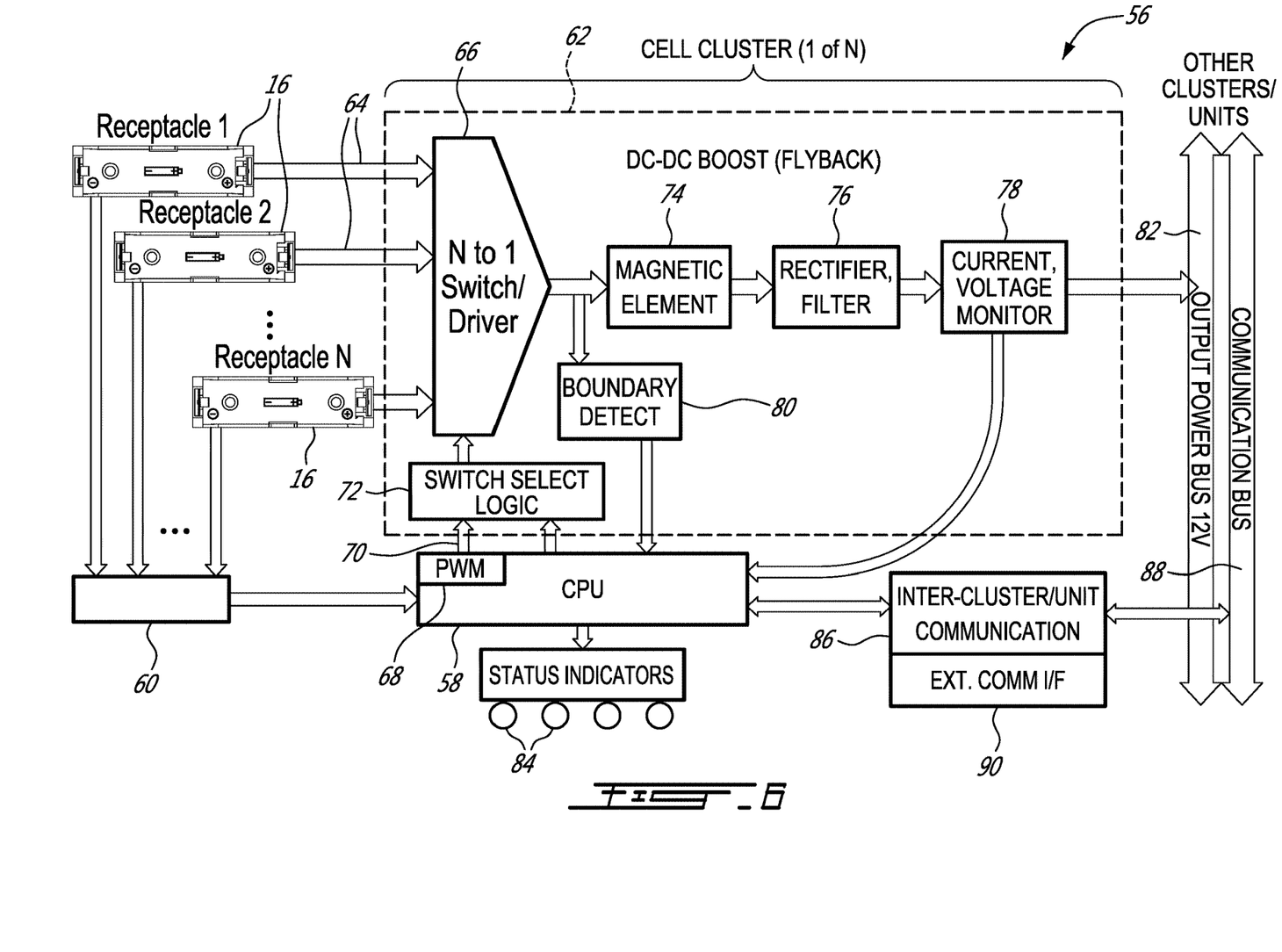
FIG. 6 comprises a block diagram of the electronics of a battery harvester in accordance with a first illustrative embodiment of the present invention.

Referring now to FIG. 6 in addition to FIGS. 5A and 5B, in a first embodiment electronics 56 are provided on respective PCB boards 50, 52 to manage batteries received in one or other of the receptacles 16. A Central Processing Unit (CPU) 58 is provided which receives input from a cell (battery) monitoring electronics 60 as to the presence of a battery in one or other of the receptacles 16 and as well as illustratively the output current, voltage and the like. The receptacles 16 are arranged into clusters 62, each cluster 62 comprising at least one receptacle 16. In a particular embodiment each cluster comprises two (2) receptacles.

Still referring to FIG. 6, for each cluster 62, the outputs 64 of each of the receptacles 16 are fed, illustratively in parallel, into a selector switch 66, controlled by the CPU 58 according to software and configuration settings stored in memory (not shown). In this regard, the CPU comprises a Pulse Width Modulation (PWM) module 68 which generates a plurality of PWM output signals 70. Switch select logic 72 is also provided for each cluster 62, controlled by the CPU 58 and which provides the requisite logic for driving the cluster switch 66 with the PWM output signals 70. The output of the switch 66 is input to a flyback DC-DC boost comprising a magnetic element 74 and a rectifier filter 76 in order to boost the output of the various cells such that they achieve a nominal overall output of, for example, 12 volts. A current voltage monitor 78 is also provided to ensure that the output voltage on the power bus 82 is maintained at the nominal bus voltage. The output of the switch 66 is also fed back to the CPU via a boundary detect module 80 to aid in driving the switch select logic 72. The switching speed of the PWM output signals is illustratively relatively low (for example circa 10 khz-100 khz).

Still referring to FIG. 6, the receptacles 16 of each cluster 62 are illustratively arranged with their outputs in parallel. Initially, for a given cluster the open circuit voltage of each battery 18 placed in a respective receptacle 16 is evaluated and the battery with the highest voltage discharged first. To reduce the effect one battery in a cluster may have on another, other batteries 18 in the cluster 62 are discharged as the current voltage of those batteries already discharging reaches within a predetermined voltage of the open circuit voltage of a battery to be discharged. This allows batteries of different chemistries to be safely discharged together. As the load increases on the output, the voltage typically drops and in order to compensate and maintain the output voltage constant (illustratively at 12V), the duty cycle of the PWM can be increased thereby increasing the output current/voltage of the output of the flyback convertor. The CPU 58 controls all clusters as in 62 at the same time thereby unifying the control. In particular, the CPU 58 can provide an indication of those clusters 62 in which the batteries are in need of replacement.

Still referring to FIG. 6, status indicators 84 such as LEDs are provided and controlled by the CPU 58 for indicating the status of a battery in one or other of the receptacles 16, for example a status of empty or the like. Additionally, the CPU can communicate with other CPUs (for example on a different interconnected PCB board or a second device 10) via one of an inter cluster communication module 86 and a communication bus 88 or an external interface 90. In this regard, and with reference to FIG. 3, a multipin connector 92, such as a Fischer MiniMax™ type connector, comprising a plurality of conductive pins 94 for interconnecting with the power bus 82 and communications bus 88 using an appropriate cable (not shown) can be provided and such that both power and data can be shared between the device 10 and one or more other like devices.

Figure 7:
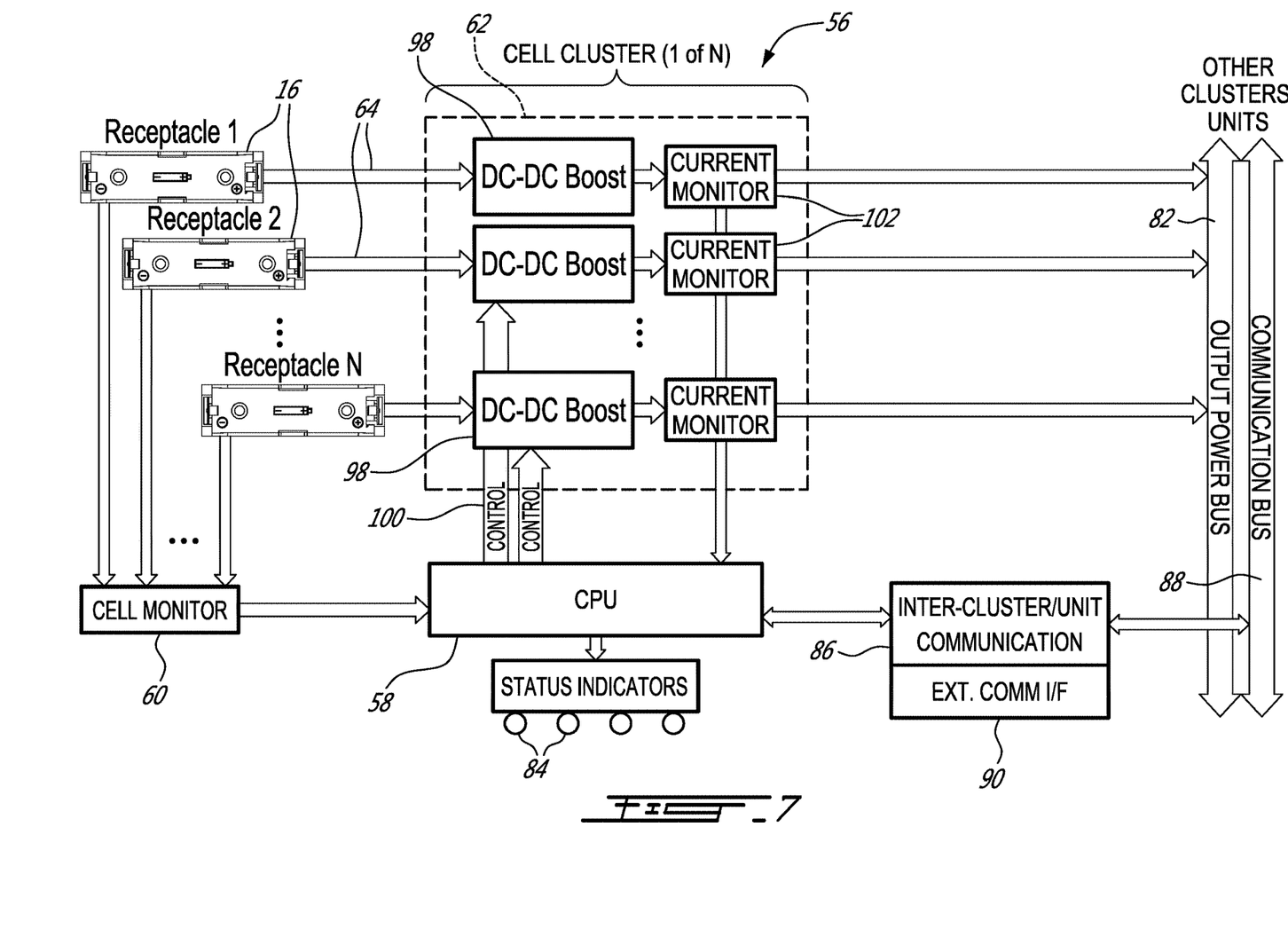
FIG. 7 comprises a block diagram of the electronics of a battery harvester in accordance with a second illustrative embodiment of the present invention.

Referring now to FIG. 7 in addition to FIGS. 5A and 5B, in a second embodiment, and similar to the first embodiment of FIG. 6, electronics 56 are provided on respective PCB boards 50, 52 to manage batteries received in one or other of the receptacles 16. The CPU 58 receives input from the monitoring electronics 60 as to the presence of a battery in one or other of the receptacles 16. The receptacles 16 are arranged into clusters 62, each cluster 62 comprising at least one receptacle 16.

Still referring to FIG. 7, for each cluster 62, the outputs 64 of each of the receptacles 16 are fed, illustratively in parallel, into a dedicated one of at least one DC-DC Boost 96. Each DC-DC Boost 96 is controlled by the CPU 58 via control signals, illustratively transmitted from the CPU 58 to each DC-DC Boost 98 via a control bus 100 or the like, and according to software and configuration settings stored in memory (not shown). In this regard, each DC-DC Boost 98 may comprise a Pulse Width Modulation (PWM) module (not shown) amongst other modules on an integrated circuit (also not shown). The output of each DC-DC Boost 98 is fed at a nominal voltage, for example 12 volts, onto the output power bus 82 via a current monitor 96 which can also form part of the same integrated circuit.

Still referring to FIG. 7, in the second embodiment, provided a battery is present in a receptacle 16 the CPU 58, using control signals transmitted via the control bus 100, is able to control the DC-DC Boost 98 to deliver an output to the power bus 82 at the nominal voltage and a selected current. The value of the selected current can be adjusted in response to feedback received from the respective current monitors 96. For example, if the CPU 58 requests a given DC-DC boost 98 to deliver 150 mA and the output cannot be sustained at the nominal voltage, then this can be detected via the current monitor 96 and adjusted by the CPU 58 accordingly. Alternatively, the requested output current of a given DC-DC boost 98 may be increased, for example in order to compensate for the removal of batteries from one or other of the receptacles 16. In some cases the DC-DC boost 98 may be commanded to cycle on and off in order to extract a maximum of energy form a battery being harvested.

Still referring to FIG. 7, status indicators 84 such as LEDs are provided and controlled by the CPU 58 for indicating the status of a battery in one or other of the receptacles 16.

Figure 8:
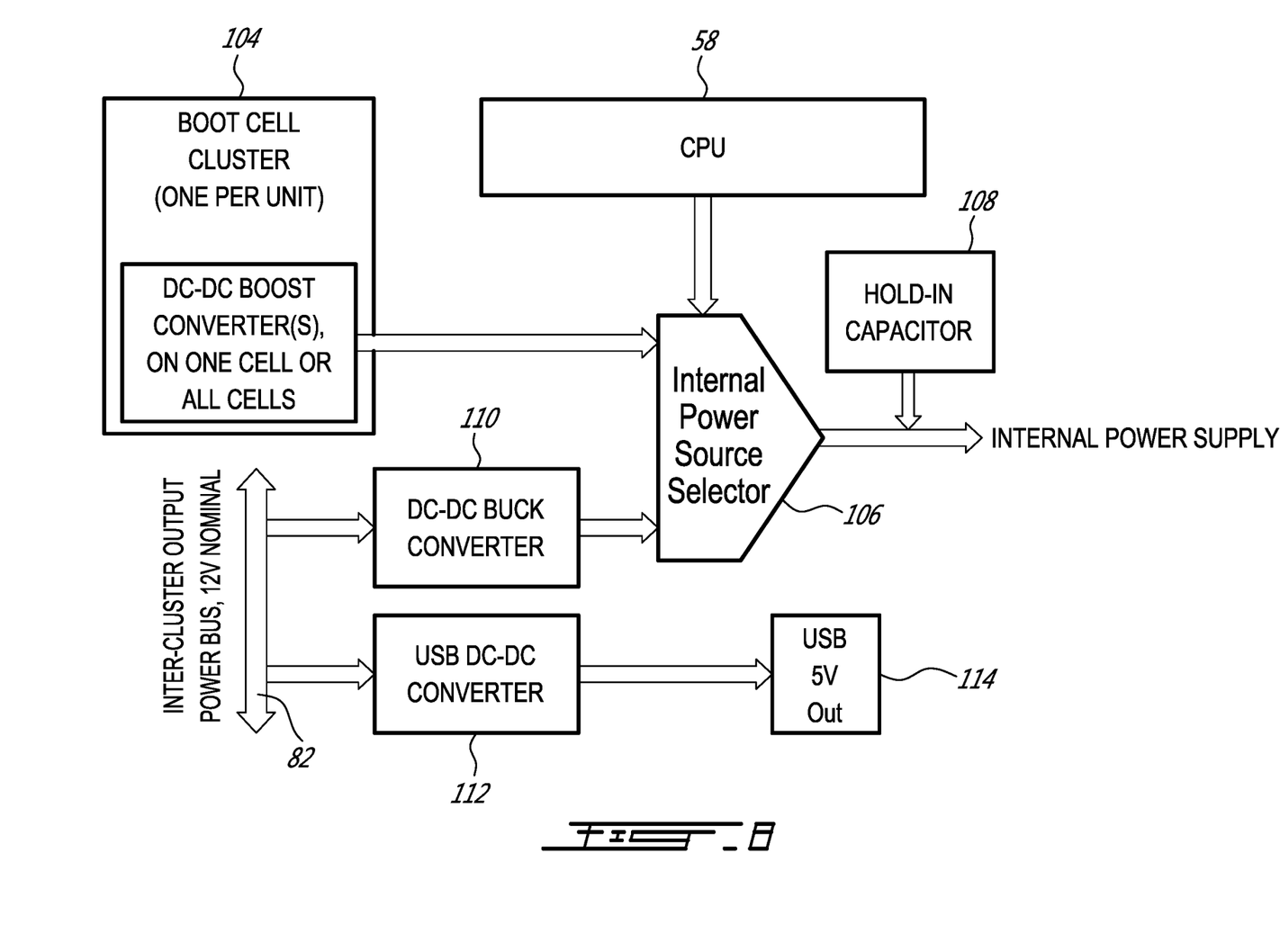
FIG. 8 provides a block diagram of internal power source selection in accordance with an illustrative embodiment of the present invention.

Referring now to FIG. 8, of note is that power to operate the CPU 58 and other electronics is provided by batteries held in one or other of the receptacles 16. In this regard, during normal operation batteries held in any of the receptacles 16 can be used to power the CPU 58 and other electronics. At start up, however, and in order to simplify the electronics, a designated first, or boot cell, cluster 104 provides power to the CPU 58 and other electronics via an internal power source selector 106 and a hold in capacitor 108. Once the CPU 58 has been powered up, the internal power source selector 106 can used to feed the internal power supply with a different source such as the 12V power bus 82. In this regard, a DC-DC buck converter 110 is used to reduce the power bus voltage to one which is suitable for powering the CPU 58 and other electronics, typically between 3V and 5V. Additionally, a DC-DC convertor 112 is provided to adjust the output voltage of the power bus 82 such that it conforms to the USB standard and be used to provide power to the USB 5V out 114.

Although the present invention has been described hereinabove by way of specific embodiments thereof, it can be modified, without departing from the spirit and nature of the subject invention as defined in the claims.

I claim:

1. A method of powering a load from a plurality of standardised batteries, the method comprising:
   interconnecting each of the plurality of standardised batteries in parallel and with the load with a respective electronic boost circuit;
   for each battery of a plurality of standardised batteries:
   raising an output voltage towards a nominal voltage at an output current using said respective electronic boost circuit;
   sensing an output voltage of said electronic boost circuit; and
   reducing said output current of said electronic boost circuit responsive to said sensed output voltage and such that said raised output voltage reaches said nominal voltage.

2. The method of claim 1, wherein a first of said standardised batteries is of a first standardised battery type and a second of said standardised batteries is of a second standardised battery type different from said first standardised battery type.

3. The method of claim 2, wherein said first standardised battery type is AA and said second standardised battery type is CR123.

* * * * *